US006109774A

United States Patent [19]

Holmes et al.

[11] Patent Number: 6,109,774

[45] Date of Patent: Aug. 29, 2000

[54] DRAWER OPERATING SYSTEM

[75] Inventors: William K. Holmes; Laird Broadfield, both of San Diego, Calif.

[73] Assignee: Pyxis Corporation, San Diego, Calif.

[21] Appl. No.: 08/659,873

[22] Filed: Jun. 7, 1996

(Under 37 CFR 1.47)

Related U.S. Application Data

[60] Provisional application No. 60/001,737, Aug. 1, 1995.

[51] Int. Cl.[7] .................... G06F 17/00; C07F 11/00

[52] U.S. Cl. .................... 364/479.01; 364/479.07; 364/479.12; 221/12

[58] Field of Search .................... 364/479.01, 479.06, 364/479.07, 479.12, 479.13; 221/2, 3, 7, 12

[56] References Cited

U.S. PATENT DOCUMENTS

| | | | |
|---|---|---|---|
| 3,138,287 | 6/1964 | Kireta | 221/94 |
| 3,744,867 | 7/1973 | Shaw | 312/234 |
| 3,752,359 | 8/1973 | Shaw | 221/5 |
| 3,802,600 | 4/1974 | Shaw | 221/5 |
| 4,047,635 | 9/1977 | Benneth, Jr. | 221/5 |
| 4,872,591 | 10/1989 | Konocka | 221/5 |
| 5,014,875 | 5/1991 | McJaughlin et al. | 221/2 |
| 5,206,637 | 4/1993 | Warren | 340/825.31 |
| 5,335,816 | 8/1994 | Kaufman et al. | 221/13 |
| 5,392,952 | 2/1995 | Bowden | 221/15 |
| 5,431,299 | 7/1995 | Brewer et al. | 221/2 |

*Primary Examiner*—Paul P. Gordon
*Attorney, Agent, or Firm*—Michael D. Steffensmeier

[57] ABSTRACT

A drawer operating system for controlling a plurality of elongated drawers having a sliding direction, each drawer terminated by a front end and a rear end and partitioned by walls into a plurality of bins consecutive with one another along the sliding direction for holding various dispensable items, the drawers housed in an array in a cabinet, each drawer arranged to move independently between a closed position and graduated, progressively opened positions to allow access to one or more bins and the contents stored therein, the system for each drawer including a monitor for tracking the length of opening of the drawer on its immediately preceding excursion, a drive train responsive to the monitor for controlling the drawer from a fully closed and locked position to an open position exposing an item-filled bin flexible, non-stretchable first device for interconnecting the drawer and the drive train to control the increment of bin exposed in the drawer, and the second control device, including a keyboard for inputting coded information concerning the particular item needed and information as to the party entering the information for actuating the drive train to authorize movement of the drawer from a closed position slidingly to an open position at least one bin-length beyond the bin exposed on the immediately preceding excursion.

32 Claims, 4 Drawing Sheets

DRAWER OPERATING SYSTEM

RELATION TO OTHER PATENT APPLICATIONS

This patent application is an outgrowth of our previously-filed Povisional patent application, filed Aug. 1, 1995 to which Ser. No. 60/001,737 has been assigned, and not abandoned prior to the filing date of this patent application.

BACKGROUND OF THE INVENTION

Field of the Invention

This invention pertains to drawers that are housed in cabinets, either alone or in multiples of many drawers in a single cabinet, such as in medication or supply cabinets or stations for dispensing pharmaceutical or other supply items from locked storage. More particularly, the invention pertains to a system for controlling the drawers such that they may be opened only a certain distance to expose only certain items with the rest of the items remaining securely stored in the cabinet.

DESCRIPTION OF THE PRIOR ART

The practice of storing and dispensing pharmaceutical items and hospital supplies from locked storage is a rather common practice. The benefits of such a practice are readily apparent and are increasingly needed to reduce medical costs and improve efficiency. With controlled storage and dispensing, the existing stock of items is completely used up before new stock is added, resulting in reduced loss from exceeding the expiration dates on certain items. Theft is controlled and virtually eliminated, especially theft of controlled substances such as pain killers and the like. The patient's records are more accurately controlled and more efficiently handled by computers interconnected the storage and dispensing cabinets. And, reordering of exhausted or near-exhausted supplies is faster and more carefully controlled. There appears to be no limit to the benefits of these practices. Our previous inventions, disclosed and claimed in U.S. Pat. No. 5,014,875 and U.S. Pat. No. 5,346,297, have been greatly assimilated into the aforesaid practice and represent the state-of-the-art.

Presently, the storage and dispensing of small items, such as ampules, syringes and the like are handled by high-density storage and dispensing devices, as disclosed and claimed in U.S. Pat. No. 5,263,596. Larger items are stored in and dispensed from auxiliary units, as disclosed and claimed in U.S. Pat. No. 5,346,297. For smaller items that are not slender in size or that are loosely housed in small packets, neither the high-density devices nor the auxiliary units are extremely efficient. These items would be more efficiently stored and dispensed from drawers of various sizes.

Unfortunately, most drawers housed in cabinets operate only between full-open and closed positions, thus allowing access to all the contents in the entire drawer. This is not acceptable where controlled dispensing is required. There are some devices that control the motion of a drawer from its closed to an open position, as disclosed and claimed in U.S. Pat. No. 5,392,951. However, total control over the drawer is not thought necessary in some medical circles. What is needed is a drawer operating system that allows graduated access to a drawer so that items stored in the drawer may be extracted from the front of the drawer and access given to deeper and more rearward parts of the drawer only after inventories in the front have been exhausted. If the distance that the drawer slides open can be controlled, then the cabinet can function as a security device, retaining therein those items that are not authorized to be dispensed when the one drawer is partially opened.

The benefits of such an arrangement are many. First, only one drawer is opened so that the user does not have to search through all of the drawers to locate the needed item. Secondly, all other items in all other drawers are retained in locked storage and not accessible until appropriate clearance is obtained. Third, with the drawer openable only a limited distance out of the cabinet, items at the rear are retained in locked storage. Fourth, with only partial opening and graduated access, the user is forced to use items stored in the front of the drawer, thus insuring the utilization of existing inventory before access to fresher inventory is granted. Finally, should theft occur, identification of the culprit is easily determined, because only the previous user had access to the other inventory in the drawer. Thus, the blame falls on their shoulders.

An important feature would be to allow the user to manually pull the drawer open to its fully authorized extent, instead of having it driven open. This is because the drawer might strike the user who is unaware it is opening. In addition, the user may wish to place a tray or other device under the drawer for aid in unloading the bin. If the drawer is driven open, it may interrupt this activity or knock the tray from the user's hands.

SUMMARY OF THE INVENTION

This invention is a unique drawer operating system for allowing graduated access to consecutively spaced bins, partitioned in a drawer, so that access to the bins is controlled. The invention is housed in the rear of each drawer and remains out of sight and out of the reach of potential thieves. It tracks the previous activity of the drawer and, when later accessed, allows the drawer to be pulled opened to a length that will expose the contents of a bin either not emptied in previous openings or not uncovered in previous openings, retaining the other item-filled bins inside the cabinet and secure from access. In the preferred embodiment, the drawer is driven from its fully-closed position to a slightly-opened position of one inch or so, to indicate to the user that this particular drawer is further openable by merely pulling it outward. When the drawer is later pushed toward its closed position, it is stopped short of full closure and subsequently slowly driven closed into a locked position in the cabinet. This latter feature prevents "slamming" of the drawers into the cabinet and reduces the potential for damage to the contents therein.

Accordingly, the main object of this invention is a drawer operating system that controls drawers in a cabinet by providing graduated access to a plurality of consecutively arranged bins. Other objects include a system that monitors the previous activity of a drawer and insures the next drawer opening will be to a bin containing items stored therein; a system that powers the drawer slightly open to allow later manual opening to the appropriate item-filled bin; a system that prevents slamming of the drawer into the cabinet so that other items stored in the drawer and the rest of the cabinet are protected against shock; a system that can be utilized in a larger drawer-sized opening to take the place of a drawer used in a cabinet of the type shown in U.S. Pat. No. 5,014,875; and a system that provides manual opening in the case of a power failure.

These and other objects of the invention will become more apparent when reading the description of the preferred embodiment along with the drawings that are appended hereto. The protection sought by the inventor may be gleaned from a fair reading of the claims that conclude this specification.

DESCRIPTION OF THE PREFERRED EMBODIMENT

Figure 1:
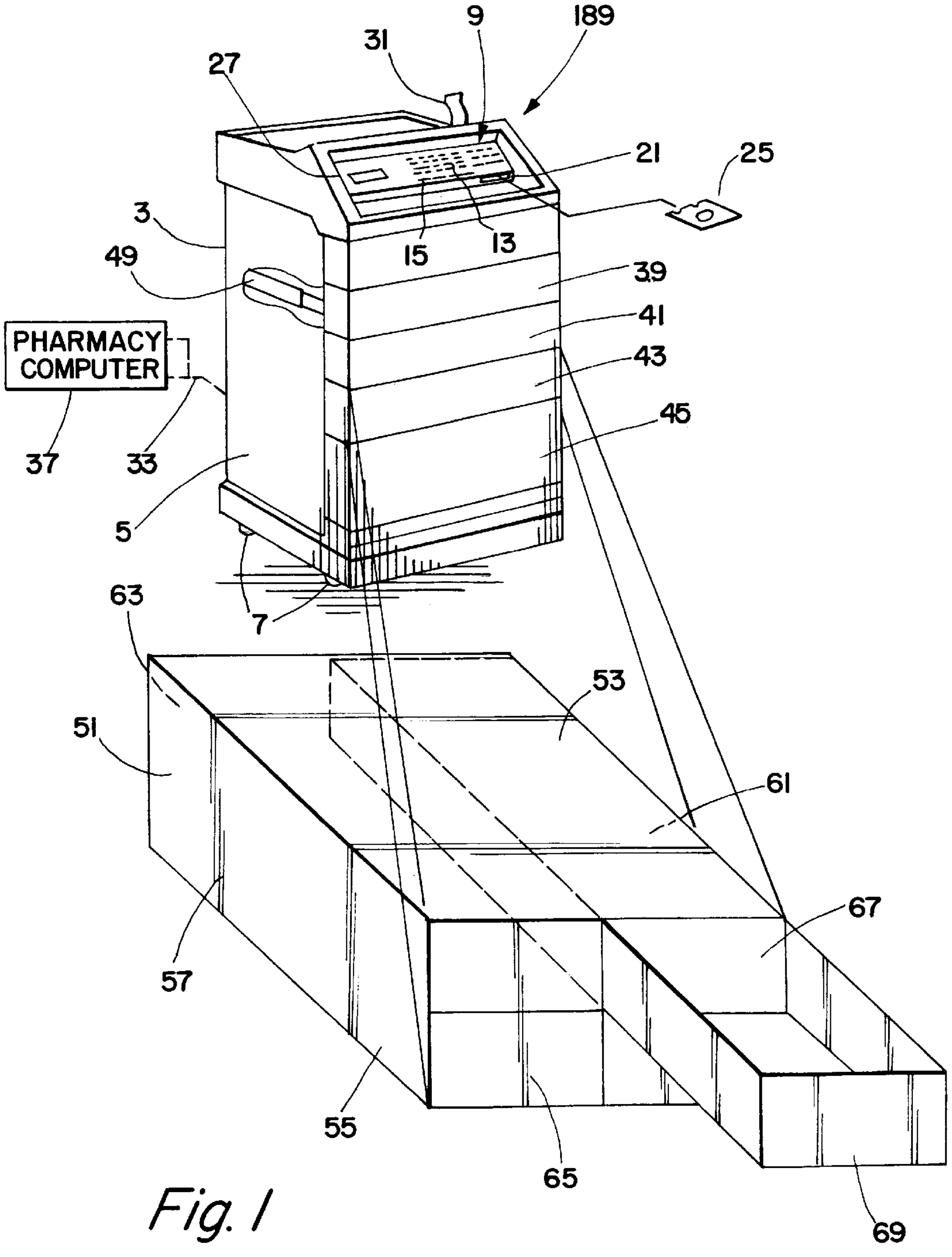
FIG. 1 is an illustrative view of a prior art pharmaceutical item dispenser station showing this invention used in place of one of the drawers thereof.
Figure 2:
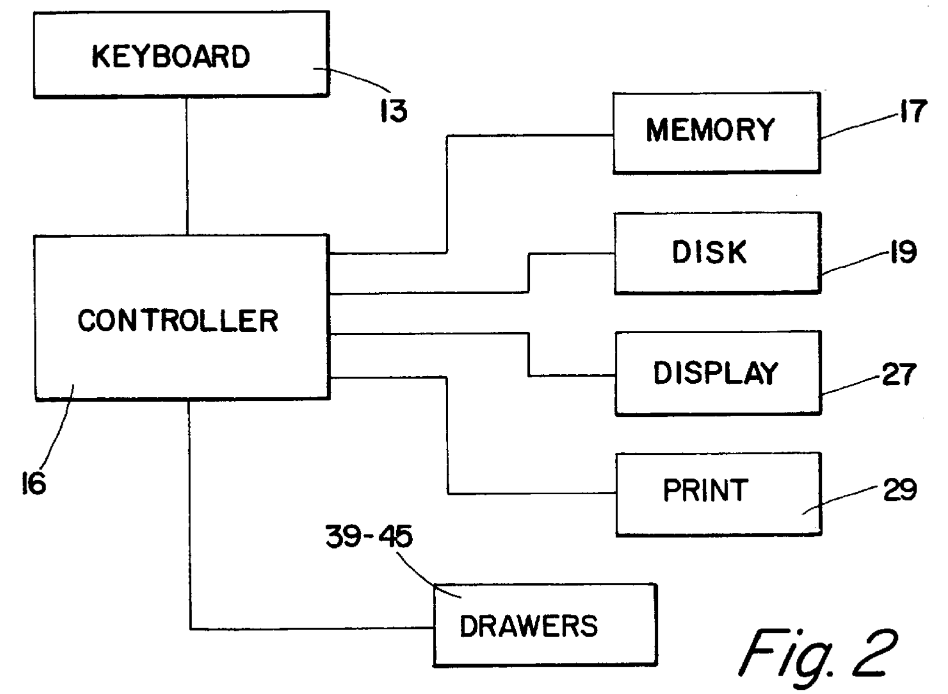
FIG. 2 is a block diagram of the logic used in the utilization of stations and cabinets that use this invention.

Turning now to the drawings wherein like elements are identified with like numerals throughout the five figures, FIG. 1 shows the invention 1 utilized in a drawer module for use in a medical dispenser station of the type disclosed and claimed in U.S. Pat. No. 5,014,875. FIG. 2 shows the invention utilized in an auxiliary storage and dispensing unit of the type disclosed and claimed in U.S. Pat. No. 5,346,297. The invention may also be used in a wide variety of other configurations and the Description here should not be taken as limiting in any way.

FIG. 1 shows the typical prior-art dispenser station 3 comprising a compact cabinet 5 which may be supported on wheels 7 for convenient portability. A control unit 9, designed for relative quick and easy access and relatively easy keyboard entry of appropriate pre-determined authorization access codes and other information, is mounted generally within the upper extent of cabinet 5 and includes a keyboard 13. Said keyboard 13 includes an array of keys 15 or similar entry devices for entering information, in conjunction with a display which utilizes liquid crystal elements or the like in programmed interaction with entered information.

FIG. 2 depicts a controller unit 16 in block form with keyboard 13 for information to it. Controller 16 is programmed to regulate access to the station drawers and to generate an access record which is stored in an internal memory 17 or via a disk drive 19 having an exposed disk port 21 to receive a conventional disk 25. Alternatively, the access record can be displayed on the cabinet display 27 and/or otherwise printed by means of an integral printer unit 29 for appropriate printout onto paper 31.

Control unit 16 is preprogrammed with appropriate information regarding the medication types associated with a group of controllers assigned to station 3. In a preferred form, this programming occurs by virtue of a data link 33 which interconnects station 1 to a main computer such as a pharmacy computer 37 of the type used commonly in a centralized hospital pharmacy to track patient requirements for medication and other pharmaceutical items. In this regard, pharmacy computer 37 desirably includes appropriate software for programming and updating a group of dispenser stations located at centralized sites throughout a hospital facility thereby permitting regular updating of each dispenser station according to the most current patient information.

Figure 3:
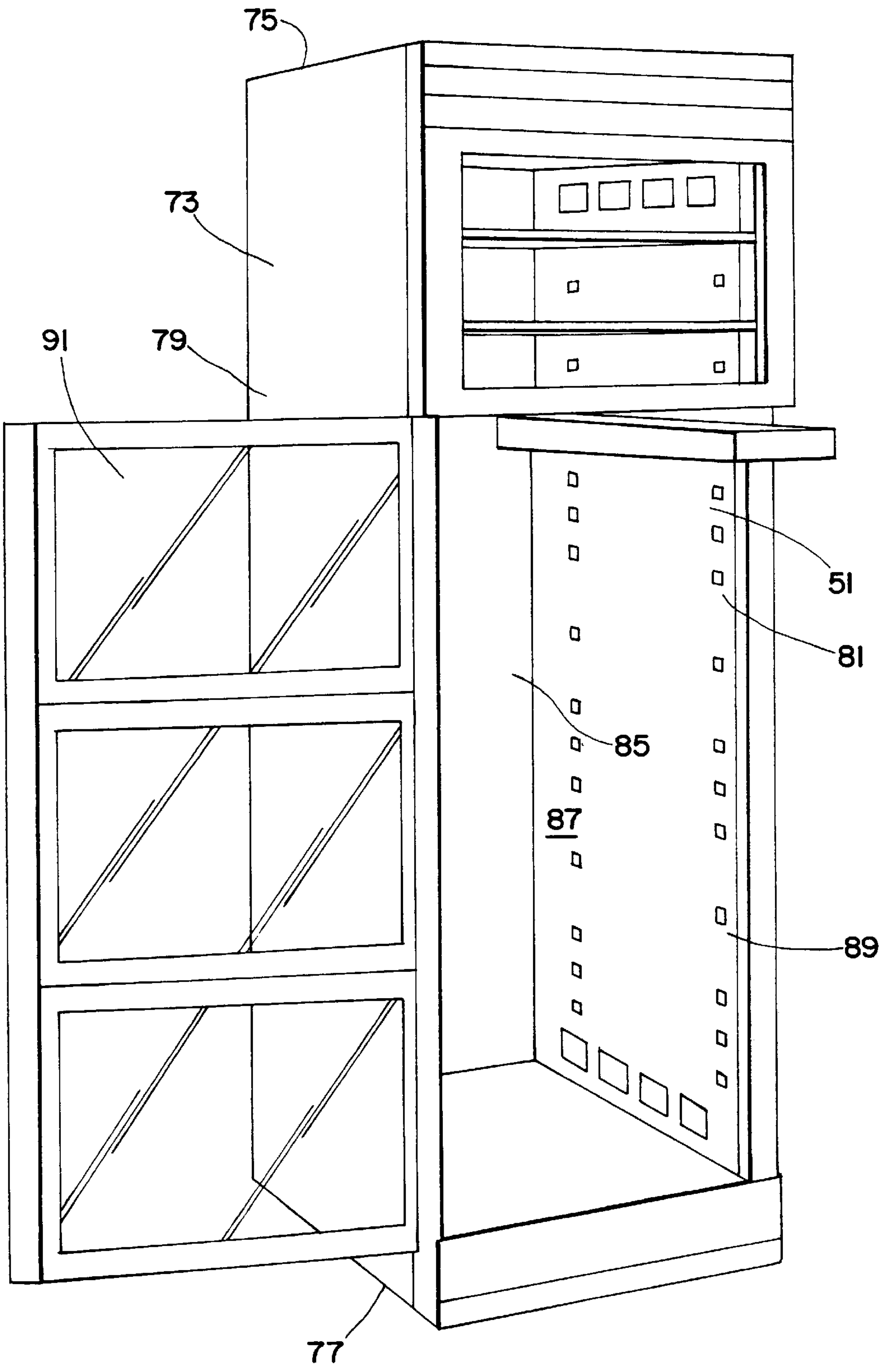
FIG. 3 is an illustrative view of a prior art supply cabinet wherein this invention may be placed for utilization.

As shown in FIG. 1, dispenser station 3 includes a stack of four drawers labelled 39, 41, 43 and 45. Drawer 41 has a generally conventional drawer geometry and is mounted on slides 49 for sliding movement with respect to station housing 3. The instant invention often applies to an array or plurality of drawers housed in a cabinet the size of, and that takes the place of, one or more drawers 39–45. This array can be in groups of smaller or mini-drawers of four, six, nine and eighteen. Housing 51, wherein this array of mini-drawers is contained, comprises spaced-apart top and bottom walls 53 and 55 respectively, held in place by spaced-apart side walls 57 and 61 and a rear wall 63, all said walls joined along their respective contacting peripheral edges. A front wall 65 covers over housing 51 and has a plurality of rectangular openings 67 formed therein through which the mini-drawers 69 pass during opening and closing. This same housing can be used in an auxiliary storage and dispensing unit as disclosed and claimed in U.S. Pat. No. 5,346,297. As shown in FIG. 3, this unit comprises a tall cabinet 73 made up of spaced-apart top and bottom panels 75 and 77 respectively, joined about three marginal edges by spaced-apart side panels 79 and 81 respectively, and a rear cabinet panel 85 integrally connected along their mutually adjacent marginal edges such as by welding or other secure fastening. Panels 75 through 85 define an interior dispensing cavity 87 accessible through a front opening 89 covered over by a door 91. Housing 51 may be fitted in said cavity or in any subcompartment formed therein.

Figure 4:
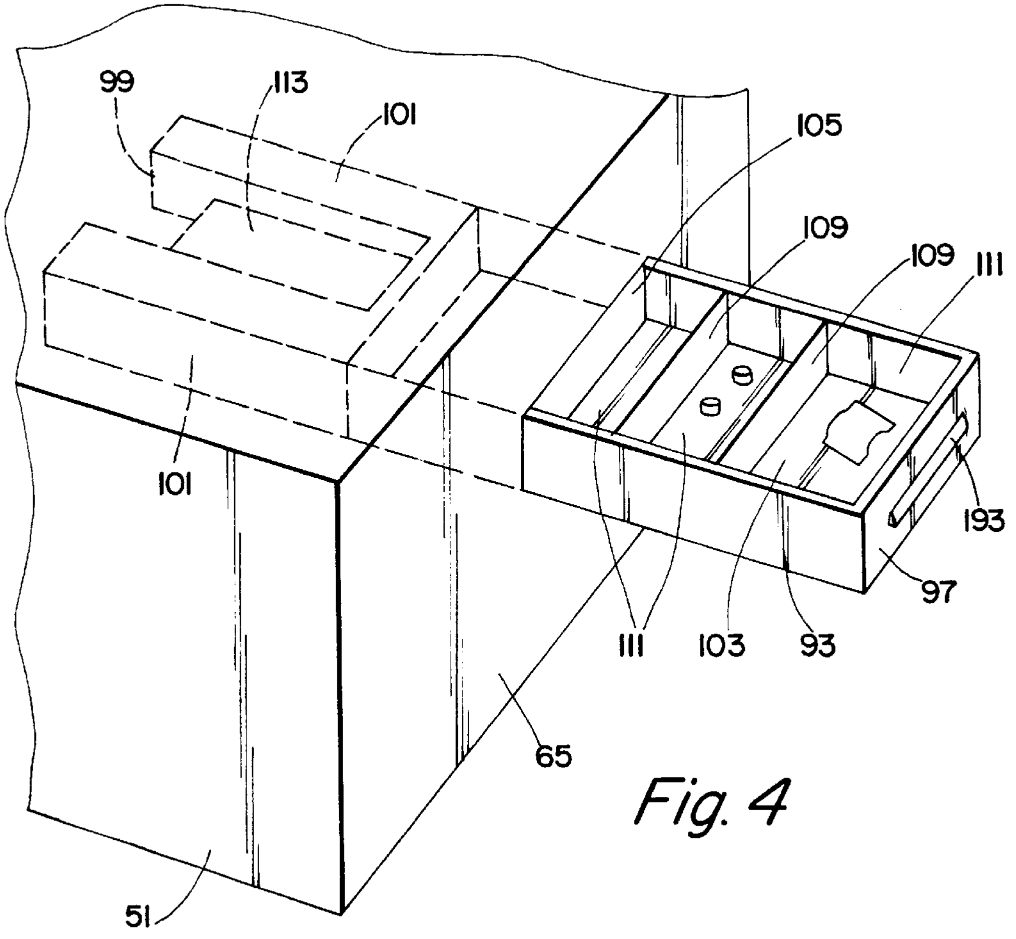
FIG. 4 is an illustrative view of a typical cabinet or housing and of a drawer, using this invention, housed therein; and, FIG. 5 is an illustrative view of the preferred embodiment of this invention showing the components and how they are arranged.

As shown in FIG. 4, the drawer operating system of this invention is used to control one or more elongated drawers 93, each of which is defined by a front end or wall 97, a rear end or wall 99. Said front and rear walls are held apart by a pair of spaced-apart side walls 101 and a bottom wall 103. Drawers 93 are arranged in complementary compartments 105 formed in a housing 51 or some other cabinet and have a sliding direction into and out of housing front wall 65. A series of transfers or cross walls 109 are formed or fitted in drawer 93 to divide it into a plurality of open-topped bins 111 consecutively arranged with one another along the sliding direction for storing small items therein, such as bandages, packages of aspirin, packets of laxative and the like, for extraction through the open top of the respective bin.

Figure 5:
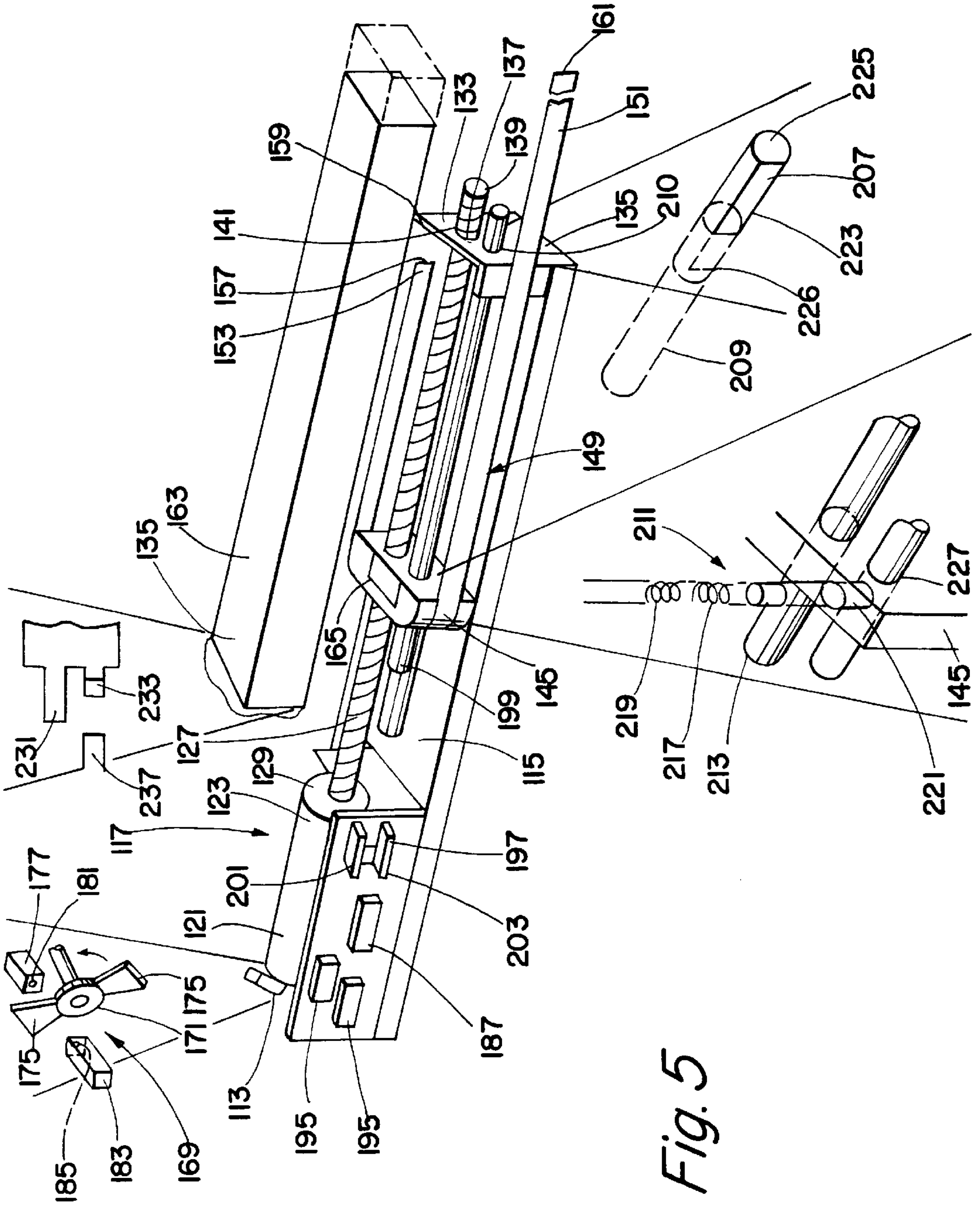

As shown in FIG. 5, located at the rear of drawer 93, in a narrow compartment 113, preferably arranged on the center line x—x or axially in said drawer are the bulk of the components of the system. An elongated base plate 115 is provided that spans the length and width of compartment 113. A drive train 117 is mounted on base plate 115 for controlling drawer 93 from its closed to its opened position. Drive train 117 includes a reversible rotary drive motor 121 comprised of an elongated electric coil 123 and a rotating drive shaft 125 operably mounted therein in axial alignment therewith for rotational movement in a forward and a reverse direction, mounted on said base plate 115 at the rear of compartment 113. An elongated threaded drive rod 127 is axially aligned with and attached to drive shaft 125 and extends from the front 129 of motor 121 forward through compartment 113, above base plate 115, to a support wall 133, extending upward from the front end 135 of plate 115. An aperture 137 is formed in wall 133 for receipt therethrough of the front end 139 of drive rod 127 in a bearing 141 pressed therein.

A follower 145 is threadably received on drive rod 127 and arranged to move linearly forward and rearward on rod 127 as a function of the rotation of said rod. Follower 145 is of a size to contact the upper surface of base plate 115 and slide therealong during its travel. It is preferred to make follower 145 of a low friction material such as TEFLON® (Trademark) to reduce the friction between it and base plate 115.

A first means 149 is provided in the form of a flexible, non-stretchable strap or belt 151 that is attached at one end 153 by a rivet 157 to an extension 159 to support wall 133 and at its other end 161 to a carriage 163 formed over base plate 115, motor 121, drive rod 127 and support wall 133, that is adapted to move with drawer 93 and compartment 113 off of base plate 115 and forward with drawer 93 as it is pulled open. Belt 151, preferably a thin, stainless steel belt, passes around the rear wall 165 of follower 145 between its ends 153 and 161. Because one end of belt 151 is fixed and the other moveable with drawer 93, physical laws make drawer 93 move at twice the distance as follower 145 is displaced along axis x—x. For instance, in FIG. 5, follower 145 is shown to be driven by rotating drive rod 127, through its threaded interconnection therewith, a distance of “y” while drawer 93 with belt end 161 connected thereto moves a distance of “2y”.

A monitor 169 is provided, as shown in FIG. 5, for tracking the length that drawer 93 was opened on its previous excursion. The reason for this is so that drawer 93 may be opened and empty bins 111 bypassed to allow drawer 93 to be opened to a bin containing items to be dispensed. As shown, monitor 169 comprises a hub 171 attached to the rear end 173 of motor drive shaft 125 for positive rotating motion therewith. At least one blade 175 extends outward from hub 171 for rotation therewith. A radiation source or sender 177 is positioned on one side of blade 175 and its broadcasting aperture 181 directed across the space through which blade 175 turns to provide a steady stream of radiation. A radiation receiver 183 is positioned opposite radiation source 177, on the other side of blade 175 and its receiving aperture 185 arranged to receive the radiation stream from source 177. A counter 187 is interconnected receiver 183 for tracking the number of times blade 175 interrupts said radiation stream. With the knowledge of the pitch of the threads on drive rod 127 and by tracking the interruptions and hence the number of turns of drive rod 127, the exact position of follower 145 may be accurately tracked and controlled.

Starting with drawer 93 in a fully-closed position in cabinet or housing 51, follower 145 is positioned fully to the rear of compartment 113 and is adjacent to motor front 129. Tape 151 is fully retracted by follower 145 to retain drawer 93 in a fully-closed and locked position.

A second means 189 is shown in FIG. 1 and includes keyboard 13 for inputting coded information concerning the particular item needed, such as the stock number of the item and the quantity, and information as to the party entering the information. Upon receipt of this coded information, second means 189 actuates the drive train motor 121 a calculated number of revolutions to move follower 145 a set distance forward toward drawer front wall 97. This allows drawer 93 to be pulled open by its handle 193 until belt 151 tightens about the rear of follower 145 to prevent further opening. At this point, at least one bin has been exposed that contains items to be extracted therefrom. Second means 189 includes a controller 193, mounted on a printed circuit board or PCB 195 containing a memory and software sufficient to initiate the various activities herein described.

While follower 145 is positioned along drive rod 127, its position is monitored and controlled by monitor 169 and its signals that are generated at counter 187 and fed through controller 193 to drive motor 121. When drawer 93 is closed, however, follower 145 may either remain at its last forward position, along drive rod 127, and allow a mechanical latch to hold drawer 93 in closed and locked position, or it may be driven by motor 121 rearward toward motor front wall 129 to tighten belt 151 and hold drawer 93 closed and locked. In the preferred embodiment, the latter approach is chosen and follower 145 is driven rearward to motor front wall 129 to lock belt 151 and drawer 93 in place.

A positional indicator 197 is provided to indicate when follower 145 is fully retracted to motor front wall 129 in order to cut off power to motor 121 and prevent damage to the system. Positional indicator 197 is shown in FIG. 5 to comprise an arm 199 extending from follower 145, rearward thereof, that passes between spaced-apart radiation source 201 and radiation receiver 203. Upon full retraction, arm 199 interrupts a steady stream of radiation from source 201 that is picked up by radiation receiver 203, and a signal is sent to controller 193 to turn off electric power to motor 121.

As shown in FIG. 5, a pair of fingers 231 are formed, one on each side of the rear end 235 of carriage 163, that extend beyond a pair of outwardly bent tabs 233. Each tab is located below a finger that mates with a pair of latches 237 formed in the cabinet 5. The purpose of the fingers 231 are for squeezing together to disconnect carriage 163, in the event of a power failure, so that drawer 93 may be manually slid out of cabinet 5. Fingers 231 are accessible at the rear of cabinet 5.

Invention 1 also includes the function of powering open the appropriate drawer a short distance, such as one inch, so that the user receives a visual indication that the one partially open drawer is the drawer where the desired dispensable item is contained. This is in contrast to the prior art device disclosed in U.S. Pat. No. 5,392,951 wherein a spring is used to power the drawer all the way from its fully closed position to its fully open and controlled position. It is not the practice of this invention to provide means for linearly moving the drawer to the open position; it is left to the user to manually open the drawer after it is partially opened.

This function is obtained by providing a bolt 207 received in follower 145 and preferably parallel to drive rod 127 arranged to travel fore and aft along with follower 145 as it is driven in its linear movement by rotating rod 127. Bolt 207 is preferably attached to or is an extension of a rod 209 that extends substantially the length of threaded drive rod 127 and passes through an aperture 210 formed in support wall 133. A friction clutch 211 is formed of a friction pad 213 urged against the surface of rod 209 by a spring 217 and held therein by a set screw 219, all housed or contained in a partially threaded bore 221 formed in follower 145. Bolt 207 has a flat 223 or other surface formed thereon, that matches the flat or other formation formed in aperture 210 in support wall 133, which extends inward from bolt end 225 approximately one inch to where it becomes terminated at 226. In operation, as follower 145 is driven forward toward drawer rear end 99, by rotation of drive rod 127, bolt 207 is carried forward due to the friction between rod 209 and follower 145. Bolt 207 comes into contact with drawer rear wall 99 and forces it and drawer 93 outward from cabinet front wall 65 for a distance of about one inch where the rear end 226 of bolt flat 223 strikes aperture 210 and bottoms against it. Thereafter, rod 209 passes through an aperture 227 formed in follower 145 and bolt 209 remains motionless through the rest of the forward motion of follower 145. Upon drawer closing, rod 209 passes backward through follower 145 moving bolt 209 one inch inward. Rod 209 bottoms against motor front 129 during the balance of retracting of follower 145 to be able to once again be driven forward when the drawer is to be pushed open.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A drawer operating system for controlling a plurality of elongated drawers having a sliding direction, each drawer terminated by a front end and a rear end and partitioned by walls into a plurality of bins consecutive with one another along the sliding direction for holding various dispensable items, the drawers housed in an array in a cabinet, each drawer arranged to move independently between a closed position and graduated, progressively opened positions to allow access to one or more bins and the contents stored therein, said system for each drawer comprising:

a) a monitor for tracking the length of opening of the drawer on its immediately preceding excursion;

b) a drive train responsive to said monitor for controlling the drawer from a fully closed and locked position to an open position exposing an item-filled bin;

c) a connector for interconnecting the drawer and said drive train to control the increment of bin exposed in the drawer; and, d) a controller, including a keyboard for inputting coded information concerning the particular item needed and information as to the party entering the information for actuating said drive train to authorize movement of the drawer from a closed position slidingly to an open position at least one bin-length beyond the bin exposed on the immediately preceding excursion.

2. The drawer operating system of claim 1 wherein said connector is flexible and non-stetchable.

3. The drawer operating system of claim 1 wherein said monitor includes:

a) a hub attached to said drive train and arranged for rotary motion therewith as a function of drawer opening and closing;

b) at least one blade extending from said hub for positive rotation therewith;

c) a radiation source and radiation receiver operably positioned on opposite sides of said hub where said blade rotates for directing a stream of radiation therebetween for interruption by said rotating blade; and, d) a counter for tracking the number of times said stream of radiation is interrupted by said rotating blade.

4. The drawer operating system of claim 1 wherein said system is located at the rear of the drawer.

5. The drawer operating system of claim 1 wherein said system is axially aligned with the drawer.

6. The drawer operating system of claim 1 wherein said system is located at the rear of the drawer and axially aligned therewith.

7. The drawer operating system of claim 1 wherein said drive train is screw operated.

8. The drawer operating system of claim 1 wherein said drive train relocates a portion of said connector to lock the drawer in its closed position.

9. The drawer operating system of claim 1 wherein said drive train comprises:

a) a rotary drive motor including a rotatable drive shaft;

b) a drive rod connected to said drive shaft for rotational powered motion and extending toward the front end of the drawer; and, c) a follower threadably received on said drive rod for linear motion forward and rearward as a function of rotation of said drive rod.

10. The drawer operating system of claim 9 further including an elongated base plate defined by a rear end for supporting said drive motor, a front end for supporting said drive rod, over which said follower passes during its travel along said drive rod.

11. The drawer operating system of claim 9, including a carriage attached to the drawer, for moving therewith during opening and closing of the drawer.

12. The drawer operating system of claim 9 wherein said rotary drive motor is a reversible electric motor.

13. The drawer operating system of claim 1 wherein said connector is a tape, belt or strap of terminal length having one end attached to said drive train and the other end attached to the drawer.

14. The drawer operating system of claim 1 further including means for determining when the drawer has been moved into a closing configuration in said cabinet to produce a signal for actuating said drive train to close the drawer and to determine when the drawer is in the fully-closed position and to lock the drawer therein.

15. The drawer operating system of claim 1 further including a positional indicator arranged to move in coordination with the drawer and reach a known position upon full drawer closure.

16. The drawer operating system of claim 15 wherein said positional indicator includes an arm, interconnected said drive train, for movement with the drawer, and further includes a switch comprising a radiation source and a radiation receiver operably positioned on both sides of said arm for directing a stream of radiation therebetween for interruption by said arm.

17. The drawer operating system of claim 1 further including a bolt, interconnected said drive train for moving the drawer from its fully closed position to a partially open position, at the beginning activation of said drawer operating sequence, to alert the party as to which drawer is openable to expose the contents therein.

18. A pharmaceutical item drawer operating system for use with an elongated drawer housed in a cabinet, the drawer defined by a front end and a rear end and subdivided into a plurality of bins for holding the supplies therein, the drawer arranged to move between a fully closed position in the cabinet and a plurality of progressively open positions to allow exposure of one or more bins for access to the supplies stored therein, said system comprising;

a) a monitor for tracking the length of opening of the drawer on its immediately preceding excursion;

b) a drive train responsive to said monitor for controlling the drawer from its fully closed and locked position to an open position exposing a requisite bin and further including a bolt for temporary contact with the drawer to move the drawer from its fully closed position to a partially open position, at the beginning of each activation of said drawer opening sequence, to alert the user that the drawer is openable;

c) a connector for interconnecting the drawer and said drive train to control the progressively open positions of the drawer to expose one or more supply-filled bins; and, d) means, including a keyboard for inputting coded information concerning the particular item stored in the drawer and information as to the party entering the coded information for actuating said drive train to partially open the drawer and subsequently authorize further manual opening of the drawer to a position exposing supplies in one or more bins.

19. The drawer operating system of claim 18 wherein movement of said connector a set distance produces sliding movement of the drawer twice said set distance.

20. The drawer operating system of claim 18 further including a pair of fingers extending outward from said drawer, to the rear of the drawer, for actuation to release the drawer from locked repose therein such as during a power outage.

21. The drawer operating system of claim 18 wherein said system is self-contained within each drawer.

22. The drawer operating system of claim 18 wherein said monitor includes:

a) a hub attached to said drive train and arranged for rotary motion therewith as a function of drawer opening and closing;

b) at least one blade extending from said hub for positive rotation therewith;

c) a radiation source and radiation receiver operably positioned on opposite sides of said hub where said blade rotates for directing a stream of radiation therebetween for interruption by said rotating blade; and, d) a counter for tracking the number of times said stream of radiation is interrupted by said rotating blade.

23. The drawer operating system of claim 18 wherein said system is located at the rear of the drawer.

24. The drawer operating system of claim 18 wherein said system is axially aligned with the drawer.

25. The drawer operating system of claim 18 wherein said system is located at the rear of the drawer and axially aligned therewith.

26. The drawer operating system of claim 18 wherein said drive train is screw operated.

27. The drawer operating system of claim 18 wherein said drive train comprises:

a) a rotary drive motor including a rotatable drive shaft;

b) a drive rod connected to said drive shaft for rotational powered motion and extending toward the front end of the drawer; and c) a follower threadably received on said drive rod for linear motion forward and rearward as a function of rotation of said drive rod.

28. The drawer operating system of claim 18 further including an elongated base plate defined by a rear end for supporting said drive motor, a front end for supporting said drive rod, over which said follower passes during its travel along said drive rod.

29. The drawer operating system of claim 18 including a carriage attached to the drawer, for moving therein during opening and closing of the drawer.

30. The process of controlling the opening and closing of an elongated drawer, housed in a cabinet, the drawer defined by a front end and a rear end and sub-divided into a plurality of consecutive bins for holding material therein, and arranged to move between a fully closed position and a plurality of progressively open positions, comprising the steps of:

a) maintaining the drawer in a fully closed and locked position;

b) tracking the length of opening of the drawer on its immediately preceding excursion;

c) receiving coded information concerning the particular item needed and information as to the party entering the information;

d) unlocking the drawer, upon receipt of appropriate coded information, to allow the drawer to be manually pulled open a distance to expose the material contained therein at least one bin; and e) locking the drawer in the cabinet upon manual shutting thereof.

31. The process of claim 30 wherein the step of unlocking the drawer includes the additional step of partially opening the drawer to provide an indication that the drawer is further openable.

32. The process of claim 30 wherein the step of unlocking the drawer includes the additional step of controlling the drawer so that it is openable a distance in excess of the distance it traveled on its immediately preceding excursion.

* * * * *